June 9, 1931.     W. H. SAUVAGE     1,809,729

FOUNDATION BRAKE RIGGING

Filed Feb. 14, 1928     2 Sheets-Sheet 1

INVENTOR.
W. H. Sauvage
BY
ATTORNEY

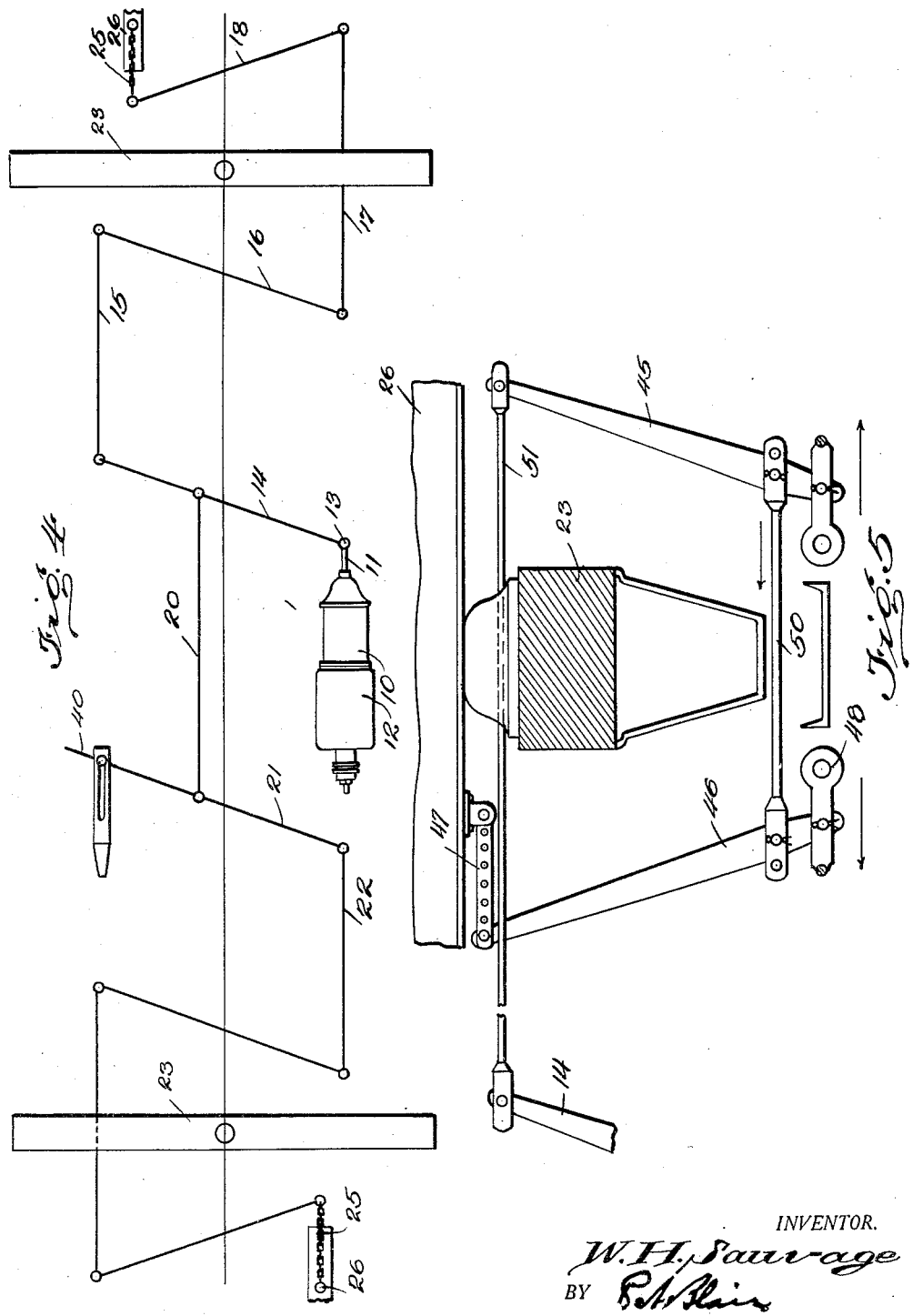

Patented June 9, 1931

1,809,729

UNITED STATES PATENT OFFICE

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE

FOUNDATION BRAKE RIGGING

Application filed February 14, 1928. Serial No. 254,256.

This invention relates to improvements in foundation brake rigging and more particularly to the foundation brake rigging of railway cars adapted to be actuated by the usual air brake cylinder. The invention will accordingly be hereinafter described more in detail with relation to its application to an ordinary railway car, altho it is of course to be understood that without material modification many features of the invention are applicable to other vehicles, such for example, as locomotives and locomotive tenders.

One of the objects of the present invention is to provide an improved foundation brake rigging with regulator means, in which the various parts will be so positioned and arranged with respect to the actuating members as to produce a perfectly balanced brake construction throughout at all times.

A further object of the present invention is to provide a balanced brake system of the above general character with regulating means, thereby to insure uniform movement of the various parts during the application of the brakes and to maintain constant piston travel and proper brake shoe clearance.

A further object of the present invention is to provide a brake of the first above mentioned character, in which many of the various parts now constituting standard equipment may be used, thereby to eliminate much expense in adapting the present invention to such equipment.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, of which—

Fig. 4 is a schematic plan view of the entire brake rigging; and

Fig. 5 is an elevational sectional view of a modified form of truck, the remainder of the system being as in Fig. 4.

Figure 1:
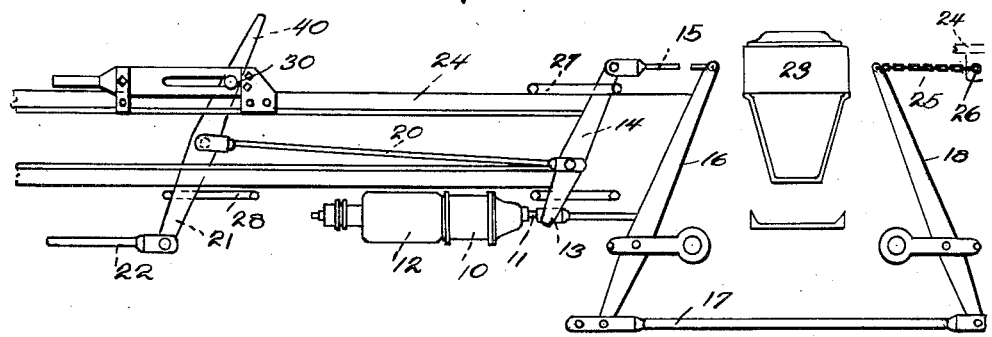
Fig. 1 is a diagrammatic combined plan and elevational view showing such parts of the entire brake system as is necessary to thoroughly understand the same.

Referring now to the drawings in detail and more particularly to Fig. 1, showing the central part of a car and a simple set of truck levers for a four wheel truck, the other end of the car being the same as the right hand part of this figure except that the brake levers lie at reverse angles, 10 indicates the usual air brake cylinder provided with a piston rod 11 adapted to be forced outwardly under air pressure from an auxiliary reservoir 12. The end of this piston rod is pivotally connected at the point 13 with one end of the live cylinder lever 14, the opposite end of which lever is connected by means of pull rod 15 with the upper end of live truck lever 16. The lower end of the truck lever 16 is connected by means of tie rod 17 to the lower end of the dead truck lever 18. A tie rod 20 extends between the cylinder lever 14 and the dead or floating lever 21 which is anchored at one end against normal movement while its opposite end is connected to pull rod 22 corresponding to the pull rod 15 for actuating the truck levers not shown but similarly arranged at the opposite end of the car. It will be noted that in this figure the effective ends of the cylinder levers are oppositely disposed with respect to center sills at each side of the medial longitudinal line of the car as more clearly shown in Fig. 4.

All of this mechanism so far described is of standard equipment on many railway cars and it is believed requires no detail description to those skilled in the art. Attention, however, is particularly directed to the fact that the upper end of the truck dead lever 18 at each end of the car instead of being adjustably supported from the truck bolster indicated at 23 as heretofore, is flexibly supported in an adjustable manner if so desired directly to the underside of the car body, such for example, as one of the draft sills indicated at 24. This flexible connection is preferably a chain 25 altho a swiveled rod might answer the purpose.

The point of anchorage 26 as herein shown may be considered fixed, but as will hereinafter be more apparent, any desired type of regulator may be used such, for example, as shown in my prior Patent No. 1,612,781, and when such type of regulator is used, then of course the supporting brackets 27 and 28 must be accurately positioned in order that an actuation of such regulators will not disturb the angularity of the remaining levers of the system other than the levers of the truck with which the particular regulator is associated.

Figure 3:
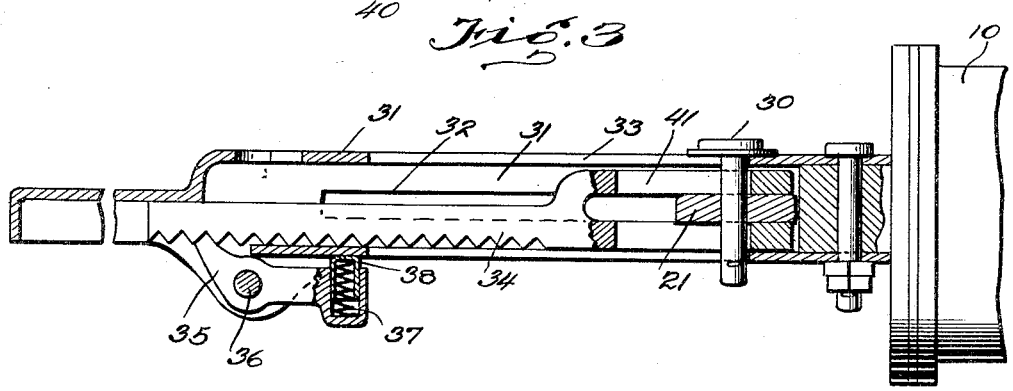
Fig. 3 is a detailed sectional view of one type of regulator.

It is preferred, however, to use a single regulator at the point 30 of that general type shown in my co-pending application (Serial No. 195,713, filed June 1, 1927). This regulator in its improved form is illustrated in Fig. 3 and comprises a relatively fixed supporting member 31 slotted throughout a part of its length as indicated at 32 and along which slot the lever 21 is adapted to move when regulated. The pin 30 also passes thru a slot 33 at right angles to the slot 32 and movably secures the lever 21 to a ratchet bar 34 which is held against a retractive movement by a spring actuated pawl 35 pivoted at 36 to the supporting member 31. A spring 37 within a suitable dust proof cap 38 maintains this ratchet bar in its regulated position.

When this regulator is actuated as by means of the handle 40 and moved relatively towards the left, the lever 21 first travels the distance of the slot 41 in the ratchet bar 34 which distance is proportional to total brake shoe clearance of all of the brake shoes of the entire car. If any excess travel exists beyond this total brake shoe clearance, then one or more teeth are taken up on the ratchet by means of a pawl 35, and the lever 21 occupies its new regulated position.

From the above it will be seen that by having a single regulator positioned on the car body in the position shown with the actuating levers 14 and 21 extending effectively in opposite directions to the truck brake rigging, the dead levers of which are flexibly connected with the car body instead of the truck bolster, then a perfectly balanced brake rigging organization is accomplished. This is particularly important in that the anchorage point for the dead truck levers is usually at one side of the king pin of the bolster when viewed in plan as in Fig. 4, and on emergency application of the brakes, a terrific shock is exerted upon this bolster tending to twist the same relatively to the track and is frequently the cause of broken flanges and derailments.

In other words, as shown in Fig. 4, an actuation of the cylinder piston causes a pull to be exerted upon the rods 15 and 22, thereby to apply the brakes on each truck, and the reactive pull is taken up by the chains or other flexible connections 25 secured at 26 to the center sills of the car. This view is intended to illustrate the oppositely disposed angularity of the truck brake levers, that is, at one end of the car, these levers 16 and 18 are positioned at approximately a forty-five degree angle with respect to both the horizontal and vertical planes and slope in a downwardly opposite direction from the corresponding levers on the other truck.

Figure 2:
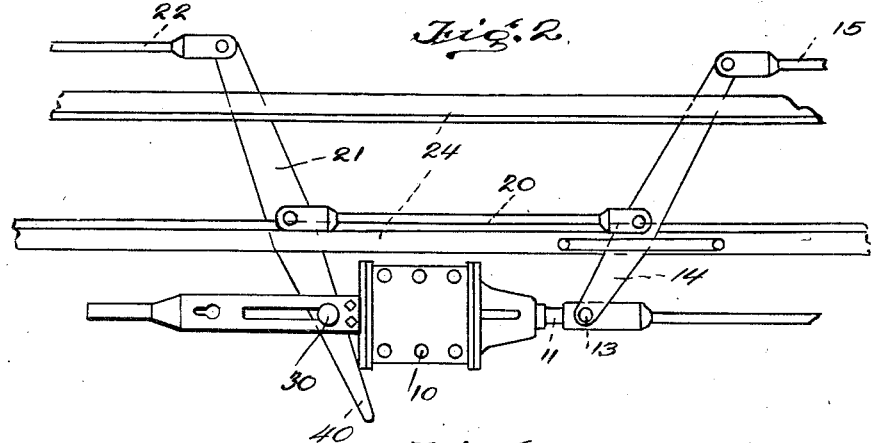
Fig. 2 is a similar view showing a portion of a modified arrangement of the parts shown in Fig. 1.

In Fig. 2 there is illustrated a slight modification of this general arrangement in that the regulator is mounted upon the rear of the air brake cylinder instead of at one side of the car body as shown in Fig. 1. This brings the actuating pull rods 15 and 22 relatively upon the same side of the medial line of the car and necessitates a corresponding change in position of the vertical angularity of the truck brake levers.

In Fig. 5, the truck here illustrated is of the general type used on certain railroads in this country and Canada, and is designed particularly to bring the operative brake mechanism of each truck above the track level as far as possible thereby to avoid dragging of the truck levers thru frequently occurring deep snow. In this view, each truck comprises a live lever 45, a dead lever 46 adjustably anchored at its upper end to bracket 47 secured preferably to the center sill of the car. The lower end of these levers 45 and 46 carry brake beams 48 of the usual type and the intermediate points are connected by means of a spreader rod 50. An actuating pull rod 51 extends from the upper end of the live lever across the truck towards the center of the car, where it connects with the cylinder lever 14 which in turn is actuated by the cylinder push rod 11 in the manner as hereinbefore described. In other words, as the cylinder push rod is forced outwardly, a pull towards the left is exerted upon the rod 51 thereby swinging the upper end of the live lever 45 to carry the brake shoes into engagement with the periphery of the wheels. A reactive movement is transmitted thru the spreader rod 50 to cause the opposite brake shoes to engage the adjacent wheels.

The relative position of these live and dead levers may be regulated to a certain extent by means of the adjustable bracket 47, but it is of course to be understood that the regulator shown in Fig. 1 and actuated by the handle 40 is incorporated and preferably used inasmuch as substantially instantaneous adjustment of the entire brake rigging may be accomplished.

It will thus be seen that the present invention provides an improved foundation brake rigging preferably with a single regulating means, whereby the parts are all perfectly arranged and balanced one with respect to the other to obtain uniform braking power on all of the brake shoes without a tendency to twist or warp the brake beams and truck. Likewise proper brake shoe clearance and uniform piston travel are obtainable in a substantially instantaneous manner by manipulation of the single regulator for the entire system.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims:

1. In a car brake rigging system of the character described, in combination, an air brake cylinder with cylinder levers, a lost motion regulator associated therewith, the effective operative ends of said levers being oppositely disposed with respect to the center sill of the car, live and dead truck brake levers connected with said cylinder levers, and points of anchorage on the car body for the dead truck levers.

2. In a car brake rigging system of the character described, in combination, an air brake cylinder with cylinder levers, a lost motion regulator associated therewith, the effective operative ends of said levers being oppositely disposed with respect to the center sill of the car, live and dead truck brake levers connected with said cylinder levers, and points of anchorage for the dead truck levers on the car body, said point of anchorage being flexibly connected with the dead levers thereby to permit a free swinging movement of the trucks with respect to the car body without materially disturbing the angularity of said truck levers.

3. In a car brake rigging system of the character described, in combination, an air brake cylinder with cylinder levers, the effective operative ends of said levers being oppositely disposed with respect to the center sill of the car, live and dead truck brake levers connected with said cylinder levers, points of anchorage for the dead truck levers, on the car body, and regulating means associated with said system thereby to maintain proper brake shoe clearance.

4. In a car brake rigging system of the character described, in combination, an air brake cylinder with cylinder levers, the effective operative ends of said levers being oppositely disposed with respect to the center sill of the car, live and dead truck brake levers connected with said cylinder levers, points of anchorage for the dead truck levers on the car body, and manually actuated regulating means associated with said system thereby to maintain proper brake shoe clearance, said regulating means being connected with one of the cylinder levers thereby to regulate the brakes on both trucks simultaneously.

5. In a car brake rigging system of the character described, in combination, an air brake cylinder, cylinder levers connected therewith, a regulator connected with one of said levers, truck brake riggings connected with the effective ends of said cylinder levers, each truck brake rigging including live and dead brake levers and fixed points of anchorage on the car body for the dead levers flexibly connected therewith.

6. In a car brake rigging system of the character described, in combination, an air brake cylinder, cylinder levers adapted to be actuated thereby, truck brake levers connected with the cylinder levers, each truck having at least one live and dead lever, points of anchorage on the car body for the dead levers, and flexible connections between the dead levers and the points of anchorage.

7. In a car brake rigging system of the character described, in combination, an air brake cylinder, cylinder levers adapted to be actuated thereby, truck brake levers connected with the cylinder levers, each truck having at least one live and dead lever, points of anchorage on the car body for the dead levers, a flexible connection between the dead levers and the points of anchorage, and regulating means associated with said levers for obtaining proper predetermined brake shoe clearance.

8. In a brake rigging system of the character described, in combination, an air brake cylinder, cylinder levers adapted to be actuated thereby, truck brake levers connected with the cylinder levers, each truck having at least one live and dead lever, points of anchorage for the dead levers, a flexible connection between the dead levers and the points of anchorage, and regulating means associated with one of said cylinder levers for obtaining proper predetermined brake shoe clearance, said regulating means constituting a point of anchorage for one of the cylinder levers and being provided with a lost motion element thereby to insure predetermined brake shoe clearance when said regulator is released after actuation.

9. In a brake rigging system of the character described, in combination, a cylinder, cylinder levers connected with each other and having their effective actuating ends oppositely positioned with respect to the center line of the car, truck brake riggings, each including at least one live and dead lever operatively connected with said cylinder levers, the dead levers each being flexibly secured at one end to the car body, a single regulator associated with one of the cylinder levers for obtaining predetermined brake shoe clearance on both trucks, said regulator including a ratchet bar having a lost motion connection with the cylinder lever with which it is associated, and a pawl coacting with said ratchet bar to hold the same in the position to which it is moved during the regulating operation.

10. In a brake rigging system of the character described, in combination, an air brake cylinder, cylinder levers connected therewith, a regulator directly associated with one of said levers, truck brake rigging connected with the effective ends of said cylinder levers, said truck brake rigging including at least one live and dead lever sloping downwardly in opposite directions with respect to the truck bolster, the dead lever being flexibly anchored whereby a perfectly balanced brake rigging is maintained.

11. In a brake rigging system for railway cars of the character described, in combination, an air brake cylinder, foundation brake gear including cylinder levers connected with the cylinder, and truck brake rigging at each end of the car connected with said cylinder levers, each truck brake rigging including at least one live and dead lever, and manually actuated regulating means associated with said foundation brake rigging, the dead lever of each truck being flexibly anchored to the car body whereby a perfectly balanced brake rigging is obtained.

Signed at New York, this 7th day of January, 1928.

WILLIAM H. SAUVAGE.